(12) United States Patent
Smith

(10) Patent No.: US 7,762,523 B2
(45) Date of Patent: Jul. 27, 2010

(54) MINIATURIZED DOUBLE LATCHING SOLENOID VALVE

(75) Inventor: James T. Smith, Columbia, MD (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 371 days.

(21) Appl. No.: 11/861,038

(22) Filed: Sep. 25, 2007

(65) Prior Publication Data

US 2009/0078900 A1   Mar. 26, 2009

(51) Int. Cl.
*F16K 31/02*   (2006.01)

(52) U.S. Cl. .................. 251/129.19; 251/77; 251/333; 251/335.3

(58) Field of Classification Search .................. 251/77, 251/129.15, 149.19, 318, 331, 333, 334, 251/129.19, 335.3
See application file for complete search history.

(56) References Cited

U.S. PATENT DOCUMENTS

| 5,108,069 | A | * | 4/1992 | Tada et al. | ..................... 251/58 |
| 5,947,442 | A | * | 9/1999 | Shurman et al. | ....... 251/129.19 |
| 6,105,933 | A | * | 8/2000 | Kanno et al. | ................. 251/331 |
| 6,666,429 | B2 | * | 12/2003 | Fukano et al. | ......... 251/129.04 |
| 6,702,252 | B2 | * | 3/2004 | Ben-Asher et al. | ..... 251/129.19 |

* cited by examiner

*Primary Examiner*—John K Fristoe, Jr.
(74) *Attorney, Agent, or Firm*—Christopher O. Edwards

(57) ABSTRACT

A valve includes a generally elongate pintle; a spacer having a rounded surface that bears against the pintle; a bulbous tip fixed to the spacer; and a hollow, generally cylindrical collar fixed to the pintle, the collar enclosing the spacer and the tip and including an opening through which a portion of the tip extends, the opening in the collar and interior of the collar being of a size such that the tip floats therein.

13 Claims, 3 Drawing Sheets

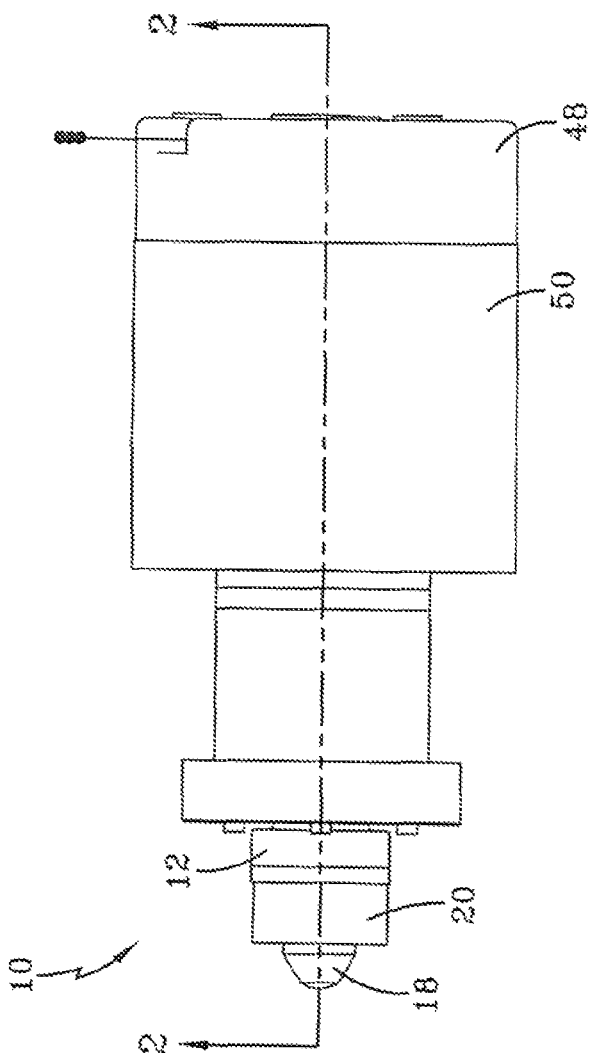
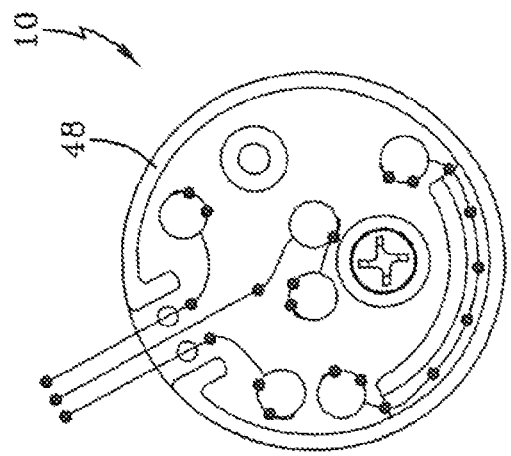
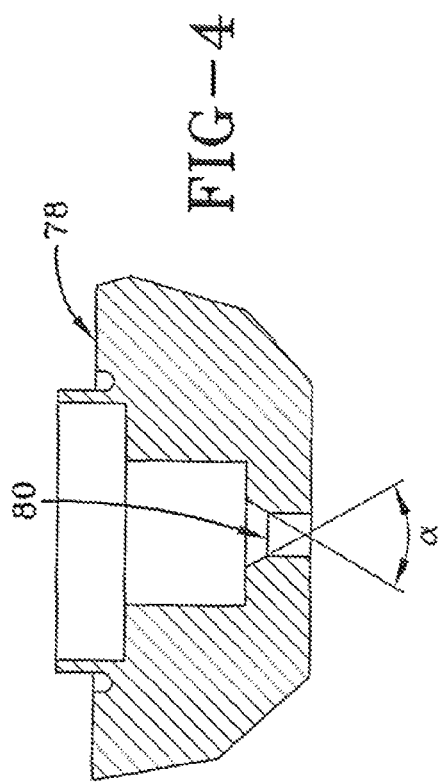

MINIATURIZED DOUBLE LATCHING SOLENOID VALVE

ORIGIN OF INVENTION

The invention claimed herein was made by employees of the United States Government, and may be manufactured and used by or for the Government for governmental purposes without the payment of any royalties thereon or therefor.

BACKGROUND OF THE INVENTION

The present disclosure relates in general to gas chromatograph mass spectrometers (GCMS) and in particular to valves for GCMS.

GCMS are used, for example, for in-situ measurements of the composition of planetary and cometary atmospheres. A significant part of the mass and size of a GCMS is in the gas sampling system. The gas sampling system of GCMS requires miniaturized valves. A Cassini/Huygens GCMS requires 30 valves. The GCMS planned for use in NASA's Mars mission will require about 50 valves. If Cassini/Huygens type valves are used for the Mars mission, the mass of the valves alone will approach 1.25 kg. The large mass, large size, complexity and high expense of the Cassini/Huygens type valves have created a need for a lighter, smaller, less complex and cheaper valve.

SUMMARY OF THE INVENTION

The disclosure presents a GCMS valve that is lighter, smaller, less complex and cheaper than known valves.

The disclosure further presents a GCMS valve that may be welded to a manifold, rather than bolted, to decrease mass and complexity. Welded valves allow for misalignment between the valve and the valve seat.

One aspect is a valve comprising a generally elongate pintle; a spacer having a rounded surface that bears against the pintle; a tip fixed to the spacer, the tip having a bulbous surface; and a hollow, generally cylindrical collar fixed to the pintle, the collar enclosing the spacer and the tip and including an opening through which a portion of the tip extends, the opening in the collar and interior of the collar being of a size such that the tip floats therein.

In one aspect the tip is free to move in five degrees of freedom.

The valve may further comprise a bellows and a plug, the bellows being attached at one end to the pintle and at another end to the plug, the pintle extending through the bellows and the plug. A bearing may be disposed above the plug wherein the pintle extends through the bearing.

The valve may additionally comprise an armature and a spring, the pintle further comprising a shoulder wherein one end of the spring bears on the pintle shoulder and the other end of the spring bears on the armature, the pintle extending through the armature and the spring.

Included in the valve may be an armature housing for containing the armature, the armature housing comprising bottom, center and top rings wherein a magnetic permeablility of the bottom and top rings is different than a magnetic permeablility of the center ring.

A solenoid assembly may be removably disposed around the armature housing, the solenoid assembly including upper and lower coils and a permanent magnet disposed between the upper and lower coils.

An electrically conductive sensor may be attached to an end of the pintle opposite the tip.

The valve may further comprise a cap disposed above the armature, the cap including a pair of electrical feed pins wherein the electrically conductive sensor contacts the electrical feed pins in an open position of the valve.

A second collar may be disposed on an upper portion of the pintle and a retainer disposed above the second collar wherein a force of the spring is adjustable by placing a shim between the second collar and the armature. A force of the spring may also be adjustable by placing a shim between the spring and the armature.

Further features and advantages of the invention will become apparent from the following detailed description taken in conjunction with the following drawing.

BRIEF DESCRIPTION OF THE DRAWING

FIG. 1 is a side view of one embodiment of the inventive valve.

FIG. 3 is an end view of FIG. 1.

FIG. 4 is a sectional view of a valve seat.

DETAILED DESCRIPTION OF THE PREFERRED EMBODIMENTS

Figure 2:
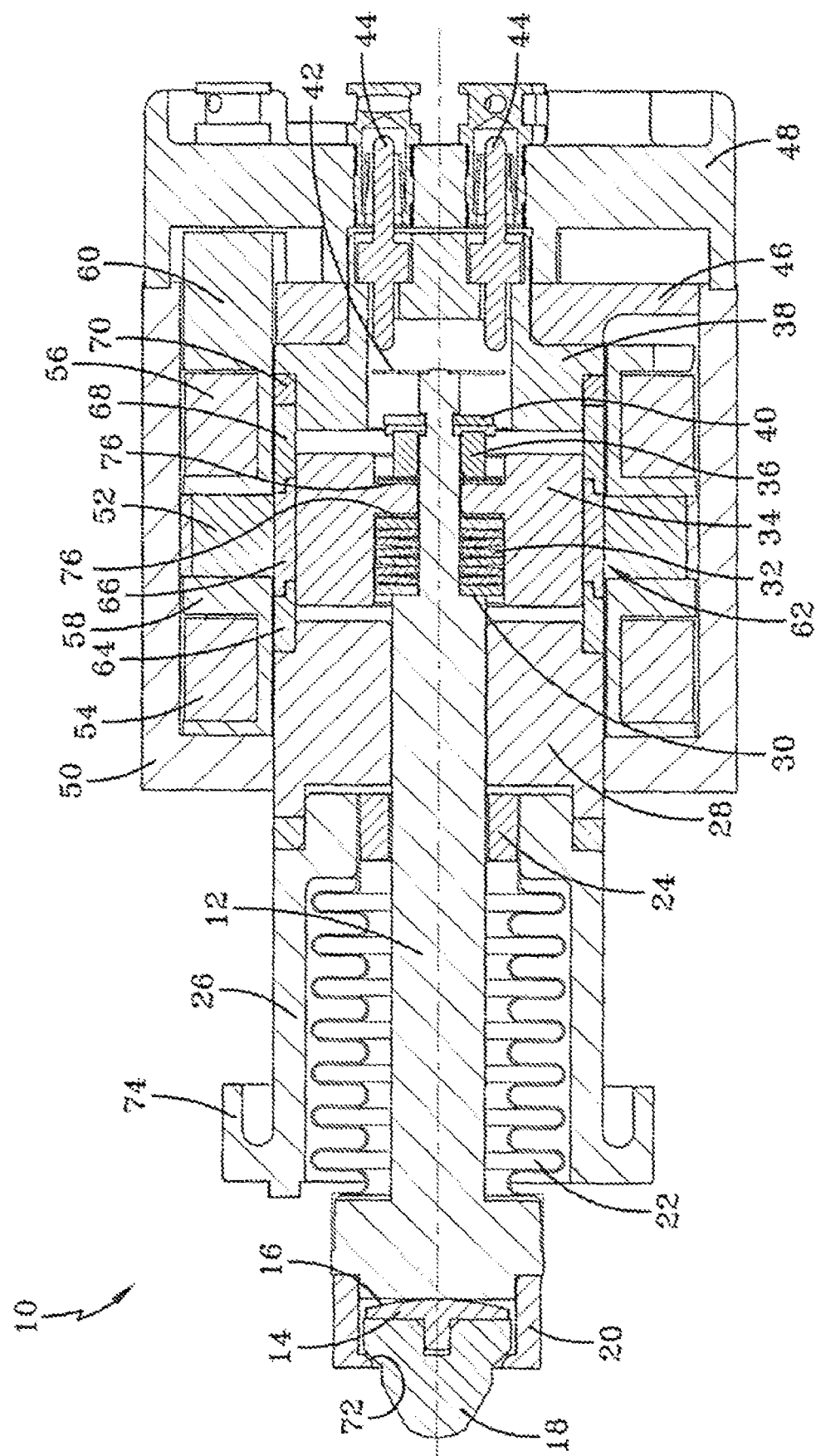
FIG. 2 is an enlarged, sectional view taken along the line 2-2 of FIG. 1.

A miniaturized double-latching valve for the gas sampling system of a GCMS will be described. The inventive valve has fewer parts, is less complex, has lower tolerance requirements, is more reliable, has less mass and is less expensive than known valves. The improved valve uses a permanent magnet to latch the valve in either the open or closed position. No electric power is required to maintain the valve in either the open or closed position. An electronic pulse energizes coils to change the state of the valve. In the closed state, a pintle tip seals the valve orifice hermetically.

Possible design parameters for the inventive valve include: Mass: less than about 27 grams; Power: about 125 watts peak; Leak Rate: about $1 \times 10^{-10}$ atm cc/sec (He); Gasflow orifice diameter: about 0.070 inches; Life cycles: less than 10,000 cycles; Operating Temperature: about −50 degrees Centigrade to about +200 degrees Centigrade; Survival Temperature: about −70 degrees Centigrade to about +250 degrees Centigrade; Operation Time (open to closed): less than 5 msec; includes an open position indicator; hermetically isolate and minimize gas sample volume; and all materials in gas flow must be inert. These parameters are design guidelines only and do not limit the scope of the invention. Varying embodiments of the invention may or may not meet one or more of the listed parameters.

The valve includes a small double-latching solenoid valve that uses a permanent magnet to latch the armature in either the open or closed position. No intermediate position is possible. In the closed position, the armature compresses a spring, such as a stack of disc spring washers. The stack of washers press a pintle onto a tip that is pressed into the valve seat. The valve seat is the orifice to be opened or closed. To account for machining tolerances and misalignment, the tip is "floating." "Floating" means that the tip is loosely held in position by a mechanical capture, but the tip is not held firmly in-axis with the pintle. When the pintle presses the tip into the valve seat, the tip is free to rotate and translate a small amount. That is, the tip (which has a bulbous surface) "self-seats" in the conical valve seat.

To open the valve, an electronic pulse is sent to the coils. The electronic pulse cancels the magnetic flux that produces the force to hold the valve closed, and adds to the flux trying to open the valve. The electronic pulse causes the armature to move to the open position, which moves the pintle to the open position, which pulls the tip out of the valve seat and opens the valve orifice.

The floating valve tip allows manufacturing tolerances to be relaxed. The floating feature, combined with the radius of curvature on the tip, allows the tip to "self-seat" in the valve seat. The valve may be directly welded into a manifold without the need of a precisely located and attached intermediate valve plate. Two independent coils are used in the solenoid, which is removable from the valve. If there is a failure associated with one of the coils, the entire solenoid may be removed and replaced without removing the valve from the manifold. Additionally, the coils may be run in parallel to add redundancy or in series to lower the current requirement.

FIG. 1 is a side view of one embodiment 10 of the valve. FIG. 2 is an enlarged, sectional view taken along the line 2-2 of FIG. 1. FIG. 3 is an end view of FIG. 1. Referring now to FIG. 2, valve 10 includes a generally elongate pintle 12 that bears against a spacer 14 fixed to tip 18. A hollow, generally cylindrical collar 20 is fixed to pintle 12 and surrounds spacer 14 and tip 18. Tip 18 partially protrudes from collar 20 through reduced diameter opening 72 of collar 20. Tip 18 seals a valve seat, not shown in FIGS. 1-3.

Lower end of pintle 12 is enclosed in bellows 22 which is fixed to the pintle 12 at one end and a plug 24 at the other end. The purpose of bellows 22 is to provide a gas seal. Bellows 22 is surrounded by bellows housing 26 which may be provided with a C-lip 74 or similar structure for welding the valve 10 to a manifold. Pintle 12 passes through a bearing 28 which is fixed on one end to a weld ring 70 and on another end to armature housing 62. Armature 34 defines an opening in which a spring 32 is disposed. Spring 32 bears on one end against a shoulder 30 of pintle 12 and on another end against the armature 34. A collar 36 and retainer 38 are disposed around the upper end of pintle 12.

On the upper end of pintle 12 is a sensor 42 in the form of a flexible, conductive disc. When sensor 42 contacts electrical feed pins 44, an electrical circuit is closed and an indicator, such as a lamp (not shown) indicates that the valve 10 is open. Cap 38 holds electrical feed pins 44. A top plate 46 fits around cap 38. A second cap 48 seals the end of the valve 10 and includes electrical contacts (shown as black dots in FIG. 3) on its outer surface. A solenoid housing 50 encloses an upper bobbin 60 and a lower bobbin 58. Upper bobbin 60 includes upper coil 56 and lower bobbin 58 includes lower coil 54. A permanent magnet 52 is disposed between the upper and lower coils 56, 54.

The materials of construction for the valve components depend on the particular use for the valve 10. In the case of a GCMS valve used on the planet Mars, the possible materials include SP 22 VESPEL (Dupont) for the tip 18; SP 1 VESPEL (Dupont) for the cap 48; 304 stainless steel for spacer 14; 321 stainless steel for the bellows 22; Inconel 718 for the pintle 12; and Hiperco for the bearing 28, armature 34, cap 38, top plate 46 and solenoid housing 50. Spring 32 comprises, for example, Belleville washers. To adjust the amount of force applied to the valve seat by pintle 12, shims or spacers 76 may be placed between spring 32 and armature 34, and between collar 36 and armature 34.

The armature housing 62 comprises a bottom ring 64, a center ring 66 and a top ring 68. The bottom and top rings 64, 68 magnetically isolate the center ring 66. Isolation is accomplished by using materials with differing magnetic permeabilites for the bottom and top rings 64, 68 and the center ring, respectively. The center ring may comprise Hiperco and the bottom and top rings 64, 68 may comprise Inconel 718.

Permanent magnet 52 holds pintle 12 in the open or closed position. The coils 54, 56 are energized when moving the pintle 12 from open to closed or closed to open. Otherwise, the coils 54, 56 are not energized. Double latching valves are known, thus, details of the magnetic flux paths are not described herein.

A feature of the valve 10 is the floating tip 18. Pintle 12 bears on a rounded surface 16 of spacer 14. Spacer 14 is fixed to tip 18 such that the spacer 14 and tip 18 move together. The portion of tip 18 that closes the valve seat is slightly bulbous. Collar 20 and reduced diameter opening 72 of collar 20 are of a size such that the tip 18 may "float" therein. Tip 18 is free to move in 5 degrees of freedom. The thrust axis is constrained by the pintle 12 contacting the rounded surface 16 of the spacer 14 as the tip 18 begins to contact the valve seat.

Due to the slight bulbous shape of the tip 18, the tip 18 will "self seat" and seal the orifice. The self-seating feature allows for some valve-to-valve seat misalignment, while still sealing the valve properly. The misalignment "tolerance" greatly reduces the manufacturing and assembly time and cost. As an example, for a pintle 12 with about 0.030 inches of travel between the open and closed position, there may be about a 0.002 or 0.003 inch gap between the tip 18 and the opening 72 in the collar 20. However, the gap may be smaller or larger, for example, from about 0.001 to about 0.005 inches.

Another advantage of the invention is that the solenoid assembly is removable from the valve 10, which is typically welded in place. Thus, if one of the coils fails, only the solenoid need be replaced, rather than the complete valve 10. The removable solenoid also allows for a higher temperature bakeout of the valve body, if necessary. For example, if a 200 degree Centigrade wire is used in the coils, the solenoid could simply be removed for a 300 degree Centigrade bakeout. On the other hand, it is possible for the coils to be made of high temperature ceramic-coated wire that will withstand heat as well as the valve body. Referring to FIG. 2, removing cap 48 allows one to remove the solenoid assembly, without disassembling any other part of the valve 10.

FIG. 4 is a sectional view of an exemplary valve seat 78 made of, for example, titanium. The angle alpha at the orifice 80 is about 60 degrees. The following steps provide a method of lapping and polishing the valve seat 80:

1. A steel rod of slightly over the largest diameter of the valve seat is cut to about 2 inches.
2. A 60 degree cone is cut on one end of the steel rod.
3. A support is made to hold the rod perpendicular to the valve seat.
4. Lap the valve seat with garnet lapping compound 25 micron average particle size and water as a carrier, rotating the rod lap CC and CW between the fingers.
5. When the seat is fully lapped, as determined by inspection at 40×, lap with 10 micron garnet lapping compound.
6. When fully lapped, lap with garnet 5 micron compound.
7. Clean the valve seats well with soap and water to remove the lapping compound.
8. A rotatable felt polisher will need to be shaped to fit the actual valve seat and reach to the seat.
9. Rotate the polisher at approximately 500 rpm. Use Linde C (average particle size 1 micron) polishing compound as a polishing agent and water as a carrier/lubricant. Four (4) pounds per square inch pressure is nominal
10. Polish approximately 40 minutes.
11. Inspect with a 40× microscope. Polish longer if it appears necessary or if improvement continues.
12. Clean well with soap and water. Blow dry with compressed air.
13. Wipe with acetone wetted cotton swaps. Repeat until all particles are removed.

Figure 5:
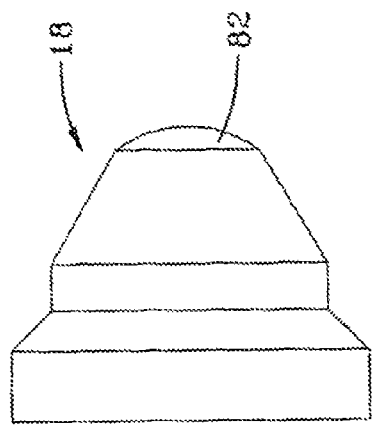
FIG. 5 is a top view of a tip.
Figure 6:
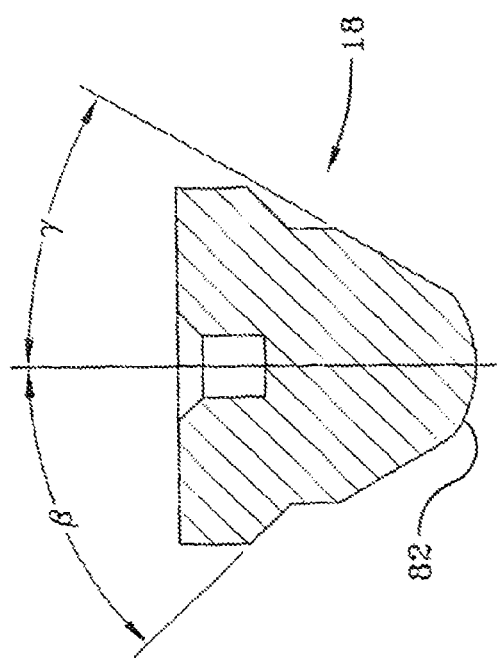
FIG. 6 is a sectional view of FIG. 5 along the line 6-6 of FIG. 5.
Figure 7:
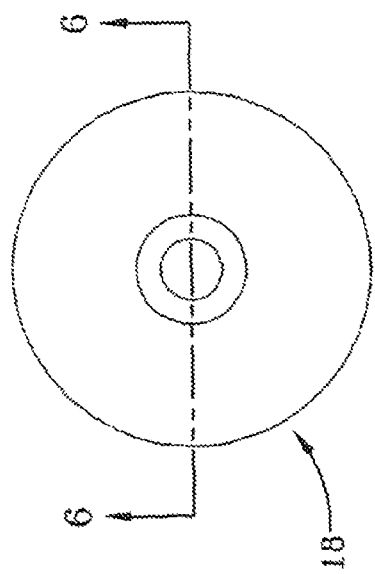
FIG. 7 is a side view of FIG. 5.

Manufacture of the tip 18 is important. FIG. 5 is a top view of an exemplary tip 18. FIG. 6 is a sectional view of FIG. 5 along the line 6-6 of FIG. 5. FIG. 7 is a side view of FIG. 5. The tip 18 is diamond turned to have a slightly bulbous surface 82 with a radius of, for example, about 0.15 inches. Exemplary values for the angles beta and gamma shown in FIG. 6 are 45 and 30 degrees, respectively. An exemplary "SAG" file for a final machining process follows:

SAG for radius of curvature=0.15

| \*\*\*\*CUTTING OCCURS IN BOTH DIRECTIONS\*\*\*\* | | | |
|---|---|---|---|
| | Radius sag | | Axis location |
| CYLINDER SECTION | | | |
| X | 0.05400000 | Z | 0.000 |
| X | 0.05400000 | Z | 0.074 |
| TAPER SECTION | | | |
| X | 0.05725248 | Z | 0.054 |
| X | 0.05696182 | Z | 0.055 |
| X | 0.05666361 | Z | 0.056 |
| X | 0.05635779 | Z | 0.057 |
| X | 0.05604433 | Z | 0.058 |
| X | 0.05572317 | Z | 0.059 |
| X | 0.05539426 | Z | 0.060 |
| X | 0.05505754 | Z | 0.061 |
| X | 0.05471296 | Z | 0.062 |
| X | 0.05436047 | Z | 0.063 |
| X | 0.05400000 | Z | 0.064 |
| X | 0.05363149 | Z | 0.065 |
| X | 0.05325488 | Z | 0.066 |
| X | 0.05287010 | Z | 0.067 |
| X | 0.05247709 | Z | 0.068 |
| X | 0.05207577 | Z | 0.069 |
| X | 0.05166607 | Z | 0.070 |
| X | 0.05124793 | Z | 0.071 |
| X | 0.05082125 | Z | 0.072 |
| X | 0.05038597 | Z | 0.073 |
| X | 0.04994199 | Z | 0.074 |
| X | 0.04948925 | Z | 0.075 |
| X | 0.04902763 | Z | 0.076 |
| X | 0.04855707 | Z | 0.077 |
| X | 0.04807746 | Z | 0.078 |
| X | 0.04758871 | Z | 0.079 |
| X | 0.04709071 | Z | 0.080 |
| X | 0.04658336 | Z | 0.081 |
| X | 0.04606656 | Z | 0.082 |
| X | 0.04554020 | Z | 0.083 |
| X | 0.04500416 | Z | 0.084 |
| X | 0.04445832 | Z | 0.085 |
| X | 0.04390256 | Z | 0.086 |
| X | 0.04333675 | Z | 0.087 |
| X | 0.04276076 | Z | 0.088 |
| X | 0.04217446 | Z | 0.089 |
| X | 0.04157770 | Z | 0.090 |
| X | 0.04097035 | Z | 0.091 |
| X | 0.04035223 | Z | 0.092 |
| X | 0.03972321 | Z | 0.093 |
| X | 0.03908311 | Z | 0.094 |
| X | 0.03843176 | Z | 0.095 |
| X | 0.03776899 | Z | 0.096 |
| X | 0.03709462 | Z | 0.097 |
| X | 0.03640846 | Z | 0.098 |
| X | 0.03571030 | Z | 0.099 |

-continued

| \*\*\*\*CUTTING OCCURS IN BOTH DIRECTIONS\*\*\*\* | | | |
|---|---|---|---|
| | Radius sag | | Axis location |
| X | 0.03499995 | Z | 0.100 |
| X | 0.03427718 | Z | 0.101 |
| X | 0.03354177 | Z | 0.102 |
| X | 0.03279350 | Z | 0.103 |
| X | 0.03203212 | Z | 0.104 |
| X | 0.03125737 | Z | 0.105 |
| X | 0.03046899 | Z | 0.106 |
| X | 0.02966670 | Z | 0.107 |
| X | 0.02885022 | Z | 0.108 |
| X | 0.02801924 | Z | 0.109 |
| X | 0.02717344 | Z | 0.110 |
| X | 0.02631250 | Z | 0.111 |
| X | 0.02543607 | Z | 0.112 |
| X | 0.02454377 | Z | 0.113 |
| X | 0.02363523 | Z | 0.114 |
| X | 0.02271004 | Z | 0.115 |
| X | 0.02176778 | Z | 0.116 |
| X | 0.02080800 | Z | 0.117 |
| X | 0.01983022 | Z | 0.118 |
| X | 0.01883395 | Z | 0.119 |
| TIP SECTION | | | |
| X | 0.03442383 | Z | 0.103 |
| X | 0.03346640 | Z | 0.104 |
| X | 0.03244996 | Z | 0.105 |
| X | 0.03136877 | Z | 0.106 |
| X | 0.03021589 | Z | 0.107 |
| X | 0.02898275 | Z | 0.108 |
| X | 0.02765863 | Z | 0.109 |
| X | 0.02622975 | Z | 0.110 |
| X | 0.02467793 | Z | 0.111 |
| X | 0.02297825 | Z | 0.112 |
| X | 0.02109502 | Z | 0.113 |
| X | 0.01897367 | Z | 0.114 |
| X | 0.01652271 | Z | 0.115 |
| X | 0.01356466 | Z | 0.116 |
| X | 0.00964365 | Z | 0.117 |
| X | 0.00000000 | Z | 0.118 |

| \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | |
|---|---|---|---|
| \*\*\*\*\*\*\*\*\*CUTTING DIRECTION REVERSED\*\*\*\*\*\*\*\*\*\*\* | | | |
| \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | |
| | Radius sag | | Axis location |
| TIP SECTION - INVERTED | | | |
| X | 0.00000 | Z | 0.118 |
| X | 0.00964 | Z | 0.117 |
| X | 0.01356 | Z | 0.116 |
| X | 0.01652 | Z | 0.115 |
| X | 0.01897 | Z | 0.114 |
| X | 0.02110 | Z | 0.113 |
| X | 0.02298 | Z | 0.112 |
| X | 0.02468 | Z | 0.111 |
| X | 0.02623 | Z | 0.110 |
| X | 0.02766 | Z | 0.109 |
| X | 0.02898 | Z | 0.108 |
| X | 0.03022 | Z | 0.107 |
| X | 0.03137 | Z | 0.106 |
| X | 0.03245 | Z | 0.105 |
| X | 0.03347 | Z | 0.104 |
| X | 0.03442 | Z | 0.103 |
| TAPER SECTION - INVERTED | | | |
| X | 0.01883 | Z | 0.119 |
| X | 0.01983 | Z | 0.118 |
| X | 0.02081 | Z | 0.117 |
| X | 0.02177 | Z | 0.116 |
| X | 0.02271 | Z | 0.115 |

-continued

********CUTTING DIRECTION REVERSED*********

| | Radius sag | | Axis location |
|---|---|---|---|
| X | 0.02364 | Z | 0.114 |
| X | 0.02454 | Z | 0.113 |
| X | 0.02544 | Z | 0.112 |
| X | 0.02631 | Z | 0.111 |
| X | 0.02717 | Z | 0.110 |
| X | 0.02802 | Z | 0.109 |
| X | 0.02885 | Z | 0.108 |
| X | 0.02967 | Z | 0.107 |
| X | 0.03047 | Z | 0.106 |
| X | 0.03126 | Z | 0.105 |
| X | 0.03203 | Z | 0.104 |
| X | 0.03279 | Z | 0.103 |
| X | 0.03354 | Z | 0.102 |
| X | 0.03428 | Z | 0.101 |
| X | 0.03500 | Z | 0.100 |
| X | 0.03571 | Z | 0.099 |
| X | 0.03641 | Z | 0.098 |
| X | 0.03709 | Z | 0.097 |
| X | 0.03777 | Z | 0.096 |
| X | 0.03843 | Z | 0.095 |
| X | 0.03908 | Z | 0.094 |
| X | 0.03972 | Z | 0.093 |
| X | 0.04035 | Z | 0.092 |
| X | 0.04097 | Z | 0.091 |
| X | 0.04158 | Z | 0.090 |
| X | 0.04217 | Z | 0.089 |
| X | 0.04276 | Z | 0.088 |
| X | 0.04334 | Z | 0.087 |
| X | 0.04390 | Z | 0.086 |
| X | 0.04446 | Z | 0.085 |
| X | 0.04500 | Z | 0.084 |
| X | 0.04554 | Z | 0.083 |
| X | 0.04607 | Z | 0.082 |
| X | 0.04658 | Z | 0.081 |
| X | 0.04709 | Z | 0.080 |
| X | 0.04759 | Z | 0.079 |
| X | 0.04808 | Z | 0.078 |
| X | 0.04856 | Z | 0.077 |
| X | 0.04903 | Z | 0.076 |
| X | 0.04949 | Z | 0.075 |
| X | 0.04994 | Z | 0.074 |
| X | 0.05039 | Z | 0.073 |
| X | 0.05082 | Z | 0.072 |
| X | 0.05125 | Z | 0.071 |
| X | 0.05167 | Z | 0.070 |
| X | 0.05208 | Z | 0.069 |
| X | 0.05248 | Z | 0.068 |
| X | 0.05287 | Z | 0.067 |
| X | 0.05325 | Z | 0.066 |
| X | 0.05363 | Z | 0.065 |
| X | 0.05400 | Z | 0.064 |
| X | 0.05436 | Z | 0.063 |
| X | 0.05471 | Z | 0.062 |
| X | 0.05506 | Z | 0.061 |
| X | 0.05539 | Z | 0.060 |
| X | 0.05572 | Z | 0.059 |
| X | 0.05604 | Z | 0.058 |
| X | 0.05636 | Z | 0.057 |
| X | 0.05666 | Z | 0.056 |
| X | 0.05696 | Z | 0.055 |
| X | 0.05725 | Z | 0.054 |
| CYLINDER SECTION - INVERTED | | | |
| X | 0.05400 | Z | 0.074 |
| X | 0.05400 | Z | 0.000 |

Numerous changes, alterations and modifications to the described embodiments are possible without departing from the spirit and scope of the invention as defined in the appended claims, and equivalents thereof.

What is claimed is:

1. A valve, comprising:
   a generally elongate pintle;
   a spacer having a rounded surface that bears against the pintle;
   a tip fixed to the spacer, the tip having a bulbous surface; and
   a hollow, generally cylindrical collar fixed to the pintle, the collar enclosing the spacer and the tip and including an opening through which a portion of the tip extends, the opening in the collar and interior of the collar being of a size such that the tip floats therein; wherein the tip is free to move in five degrees of freedom.

2. The valve of claim 1 wherein a radius of the bulbous surface of the tip is about 0.15 inches.

3. The valve of claim 1 wherein a gap between the tip and the opening in the collar is in the range of about 0.001 to about 0.005 inches.

4. A valve, comprising:
   a generally elongate pintle;
   a spacer having a rounded surface that bears against the pintle; a tip fixed to the spacer, the tip having a bulbous surface;
   a hollow, generally cylindrical collar fixed to the pintle, the collar enclosing the spacer and the tip and including an opening through which a portion of the tip extends, the opening in the collar and interior of the collar being of a size such that the tip floats therein; and
   a bellows and a plug, the bellows being attached at one end to the pintle and at another end to the plug, the pintle extending through the bellows and the plug.

5. The valve of claim 4 further comprising a bearing disposed above the plug wherein the pintle extends through the bearing.

6. The valve of claim 5 further comprising an armature and a spring, the pintle further comprising a shoulder wherein one end of the spring bears on the pintle shoulder and the other end of the spring bears on the armature, the pintle extending through the armature and the spring.

7. The valve of claim 6 wherein the spring comprises at least one Belleville washer.

8. The valve of claim 6 further comprising a second collar disposed on an upper portion of the pintle and a retainer disposed above the second collar wherein a force of the spring is adjustable by placing a shim between the second collar and the armature.

9. The valve of claim 6 wherein a force of the spring is adjustable by placing a shim between the spring and the armature.

10. The valve of claim 5 further comprising an armature housing for containing the armature, the armature housing comprising bottom, center and top rings wherein a magnetic permeablility of the bottom and top rings is different than a magnetic permeablility of the center ring.

11. The valve of claim 10 further comprising a solenoid assembly removably disposed around the armature housing, the solenoid assembly including upper and lower coils and a permanent magnet disposed between the upper and lower coils.

12. The valve of claim 11 further comprising an electrically conductive sensor attached to an end of the pintle opposite the tip.

13. The valve of claim 12 further comprising a cap disposed above the armature, the cap including a pair of electrical feed pins wherein the electrically conductive sensor contacts the electrical feed pins in an open position of the valve.

* * * * *